United States Patent

Klein et al.

[11] Patent Number: 5,352,156
[45] Date of Patent: Oct. 4, 1994

[54] ELASTIC DRIVE ASSEMBLY

[75] Inventors: Peter Klein, Edenkoben; Stefan Valtwies, Ottersweier, both of Fed. Rep. of Germany

[73] Assignee: LuK Lamellen und Kupplungsbau GmbH, Bühl, Fed. Rep. of Germany

[21] Appl. No.: 925,595

[22] Filed: Aug. 4, 1992

[30] Foreign Application Priority Data

Aug. 7, 1991 [DE] Fed. Rep. of Germany ....... 4126209
Nov. 28, 1991 [DE] Fed. Rep. of Germany ....... 4139168
Dec. 3, 1991 [DE] Fed. Rep. of Germany ....... 4139730

[51] Int. Cl.⁵ ............... F16H 55/36; F16H 55/30; F16D 3/12; F16D 3/80
[52] U.S. Cl. ............................ 464/67; 74/574; 192/106.2; 192/30 V; 474/174; 464/83
[58] Field of Search ............ 192/30 V, 70.17, 106.1, 192/106.2; 74/574; 464/24, 66, 67, 68, 83; 416/60; 474/70, 162, 174, 903

[56] References Cited

U.S. PATENT DOCUMENTS 4,290,295  9/1981  Kanamaru et al. ............ 474/174 X
4,881,426  11/1989  Serizawa ............................ 74/574
5,042,632  8/1992  Jäckel ............................ 192/30 V X
5,135,092  8/1992  Jäckel ............................ 192/106.2

FOREIGN PATENT DOCUMENTS 4018596  12/1991  Fed. Rep. of Germany ........ 464/83

Primary Examiner—Clifford D. Crowder
Assistant Examiner—John J. Calvert
Attorney, Agent, or Firm—Darby & Darby

[57] ABSTRACT

A sheave which can be connected to the output shaft of an internal combustion engine in a motor vehicle has a rotary input element, an output element which is coaxial with and rotatable relative to the input element and is provided with a rim for one or more endless belts or chains, one or more bearings between the input element and the output element, a damping unit which opposes rotation of the two elements relative to each other, and an inertial damper which is connected between the output shaft and the input element. The inertial damper has a ring-shaped mass which is at least partially surrounded by and is closely adjacent the rim. The rim, the inertial damper and the damping unit are interfitted in the axial direction of the sheave to contribute to compactness of the sheave.

25 Claims, 3 Drawing Sheets

ELASTIC DRIVE ASSEMBLY

BACKGROUND OF THE INVENTION

The invention relates to elastic drive assemblies or rotary parts (hereinafter called sheaves) which can be used as pulleys or sprocket wheels to transmit motion to endless flexible members in the form of belts, ropes or chains. More particularly, the invention relates to improvements in sheaves which can be utilized with advantage in motor vehicles to transmit motion from the output shaft (,e.g., crankshaft) of an internal combustion engine to one or more auxiliary aggregates including fans, pumps, air conditioners and/or others.

It is known to provide a sheave with an input element which is affixed to the shaft of an engine or another prime mover, an output element which is coaxial with and is rotatable relative to the input element and is provided with or carries a rim serving to be engaged by one or more endless belts or chains, and a damping unit which is installed between and opposes rotation of the input and output elements relative to each other, The damping unit comprises springs which are designed and installed to store energy in response to rotation of the input and output elements relative to each other. The sheave further comprises a bearing which is installed between the input and output elements. A so-called inertial damper serves to damp vibrations of the input and output elements.

OBJECTS OF THE INVENTION

An object of the invention is to provide a sheave which is more compact than heretofore known sheaves.

Another object of the invention is to provide a sheave which can be rapidly assembled with a driving member, such as the crankshaft of an internal combustion engine in a motor vehicle.

A further object of the invention is to provide a sheave which can be utilized with particular advantage under the hood of a motor vehicle.

An additional object of the invention is to provide a novel combination of various dampers and damping devices for use in the above outlined sheave.

Still another object of the invention is to provide the above outlined sheave with novel and improved input and output elements.

A further object of the invention is to provide a novel and improved distribution of dampers, bearings, input element and output element in a sheave of the above outlined character.

Another object of the invention is to provide one of the input and output elements with novel and improved means for confining a device which opposes rotation of such elements relative to each other.

SUMMARY OF THE INVENTION

The invention resides in the provision of a sheave which comprises a rotary input element connectable with a rotary driving member for rotation about a predetermined axis, an output element which is coaxial with and is rotatable relative to the input element and includes a radially outer portion having a substantially axially extending rim which is engageable by a flexible member (.such as one or more endless belts or chains), a friction reducing device which is disposed between the two elements, a damping unit which is installed between the two elements radially inwardly of the radially outer portion of the output element to oppose rotation of the elements relative to each other and includes energy storing members which store energy in response to rotation of the two elements relative to each other, and an inertial damper comprising a mass and means (including a torsional damping device). for connecting the mass to the driving member. At least a portion of the mass is radially inwardly adjacent the radially outer portion of the output element and the inertial damper as well as the damping unit and the radially outer portion of the output element are interfitted in the axial direction of the two elements.

The driving member can constitute the output element (e.g., a crankshaft) of an engine, such as the internal combustion engine of a motor vehicle, and the flexible member can transmit motion to one or more auxiliary aggregates in a motor vehicle.

The energy storing members can constitute arcuate coil springs which extend in the circumferential direction of the two elements, and the friction reducing device can comprise one or more antifriction bearings. The rim can be provided with a profiled portion which is engageable by the flexible member.

The arrangement can be such that at least the major parts of the damping unit and of the mass of the inertial damper can be disposed between the axial ends of the radially outer portion of the output element; this contributes to compactness of the sheave as seen in the axial direction of the two elements.

The mass of the inertial damper is or can be substantially ring-shaped and can be positioned in such a way that it is immediately adjacent and is surrounded by the radially outer portion of the output element.

The connecting means of the inertial damper can comprise a substantially dished input portion which is disposed radially inwardly of the mass. The input portion is provided with a recess and at least a major portion of the damping unit can be confined in the recess. Such recess extends axially of the two elements.

The input portion of the inertial damper can be directly connected to the driving member. The input element of the sheave is then provided (or can be provided) on the input portion of the inertial damper. Such sheave further comprises means for fastening the input element of the sheave to the input portion of the inertial damper. Such fastening means can be disposed radially inwardly of the bearing or bearings of the friction reducing device.

As mentioned above, the driving member can constitute a shaft, and such shaft can be directly connected with the input portion of the inertial damper adjacent an end portion of the shaft. The input portion of the inertial damper can be provided with the aforementioned recess which has an open side to afford access to the end portion of the shaft. At least the major portion of the damping unit can be disposed in the recess of the input portion of the inertial damper.

The means for fastening the input element of the sheave Go the input portion of the inertial damper can be disposed radially inwardly or outwardly of the friction reducing device at the same (or nearly the same) axial distance from the two axial ends of the radially outer portion of the output element. The arrangement can be such that the fastening means is disposed radially inwardly of the bearing or bearings of the friction reducing device and that these parts are disposed between the axial ends of the radially outer portion of the output element.

The mass of the inertial damper can be disposed radially outwardly of the damping unit, and the latter can be disposed radially outwardly of the friction reducing device.

The sheave preferably further comprises an at least substantially sealed ring-shaped housing for the energy storing members of the damping unit, and a supply of viscous fluid (e.g., oil or grease) which at least partially fills the housing. At least the major part of the housing can form part of the output element of the sheave.

The output element can be made of metallic sheet material and can further comprise a radially inwardly extending portion which is rigid (e.g., of one piece) with one axial end of the radially outer portion and has an axially extending annular depression or groove for reception and guidance of the energy storing members. The radially inwardly extending portion of the output element can include an axially extending annular radially inner portion, and each bearing of the friction reducing device can include an outer race which is adjacent to and is surrounded by the radially inner portion of the radially inwardly extending portion of the output element. The radially outer portion and the radially inwardly extending portion (.inclusive of its axially extending radially inner portion) can constitute a first section of the output element, and the latter can further comprise a second section which also consists of metallic sheet material. Such second section includes a radially outer portion which is affixed (e.g., welded) to the first section, and a second portion which is disposed radially inwardly of the radially outer portion of the second section and defines an annular depression or groove for portions of the energy storing members. The second portion of the second section overlies the depression of the radially inwardly extending portion of the first section. The sections of the output element can be provided with projections e.g., in the form of pockets) which alternate with and serve to stress the energy storing members of the damping unit in the circumferential direction of the depression in response to rotation of the input and output elements relative to each other. Analogously, the input element comprises projections (e.g., in the form of radially outwardly extending arms) which alternate with the energy storing members and serve to stress the energy storing members in cooperation with the projections of the sections of the output element in response to rotation of the input and output elements relative to each other.

The input element can further comprise a tubular intermediate portion, a first flange extending substantially radially outwardly from one axial end of the tubular portion and including the aforementioned projections or arms, and a second flange extending substantially radially inwardly from the other axial end of the tubular portion and connectable with the driving member, e.g., by way of the input portion of the inertial damper. The inner race of each bearing of the friction reducing device can surround and can be closely or immediately adjacent the tubular portion of such input element.

The internal surface of the tubular portion of the input element can be provided with at least one protuberance which serves to facilitate engagement of the input element by a tool, preferably to hold the input element against rotation while the driving member is being affixed to the input portion of the inertial damper. It is presently preferred to provide an annulus of protuberances, such annulus extending circumferentially of the tubular portion of the input element.

The input element can be provided with a centrally located chamber, and the sheave can further comprise a closure which overlies the chamber. Such closure can be detachably coupled to the output element.

The just mentioned closure can serve to prevent entry of dust and/or other foreign matter into the housing for the energy storing members of the damping unit. The arrangement may be such that the closure is to be detached from the housing (.output element) in order to afford access to the driving member while the driving member is being connected to the input portion of the inertial damper.

The novel features which are considered as characteristic of the invention are set forth in particular in the appended claims. The improved sheave itself, however, both as to its construction and its mode of operation, together with additional features and advantages thereof, will be best understood upon perusal of the following detailed description of certain presently preferred specific embodiments with reference to the accompanying drawings

DESCRIPTION OF PREFERRED EMBODIES

Figure 1:
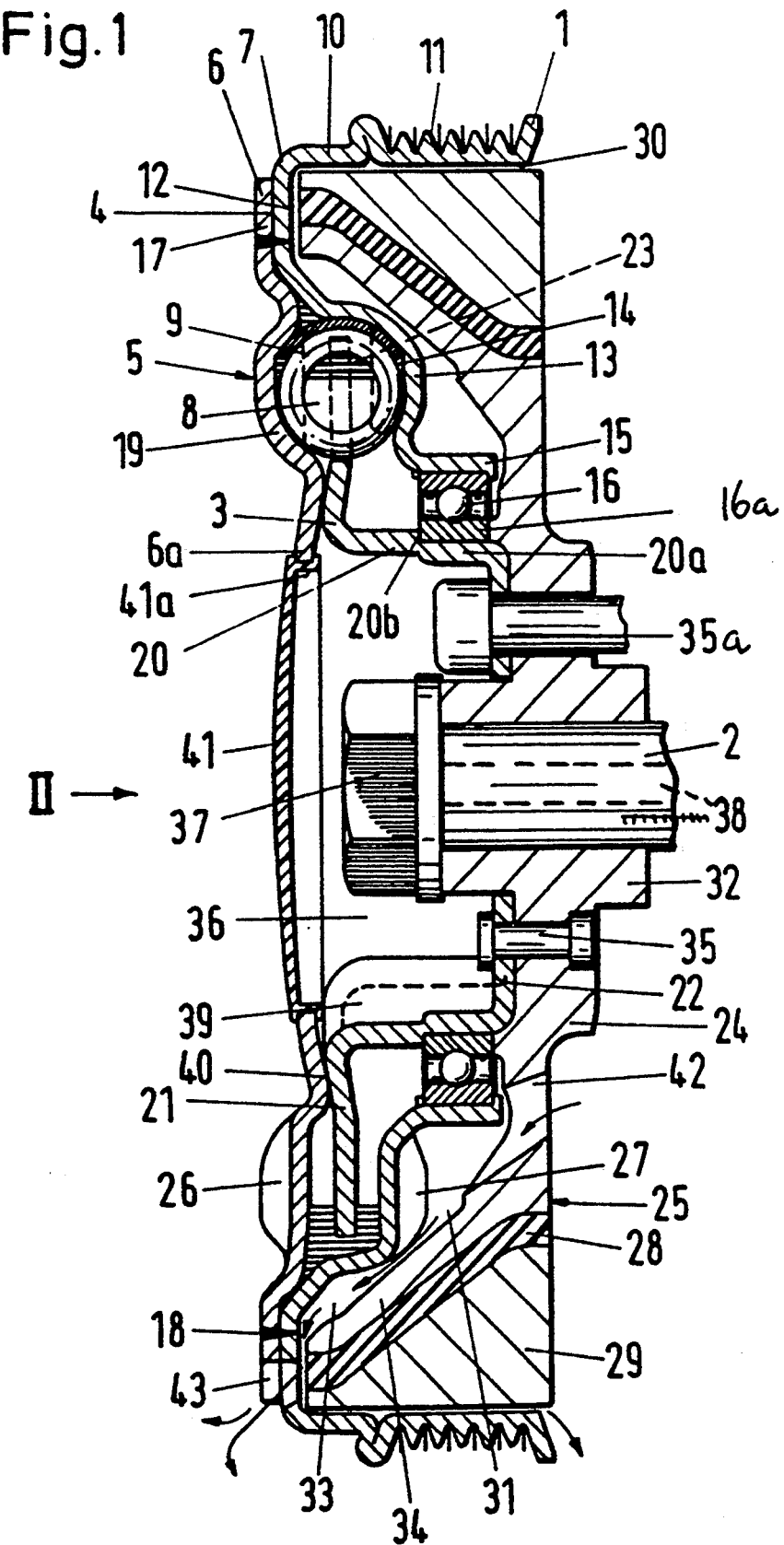
FIG. 1 is an axial sectional view of a sheave which embodies one form of the present invention.
Figure 2:
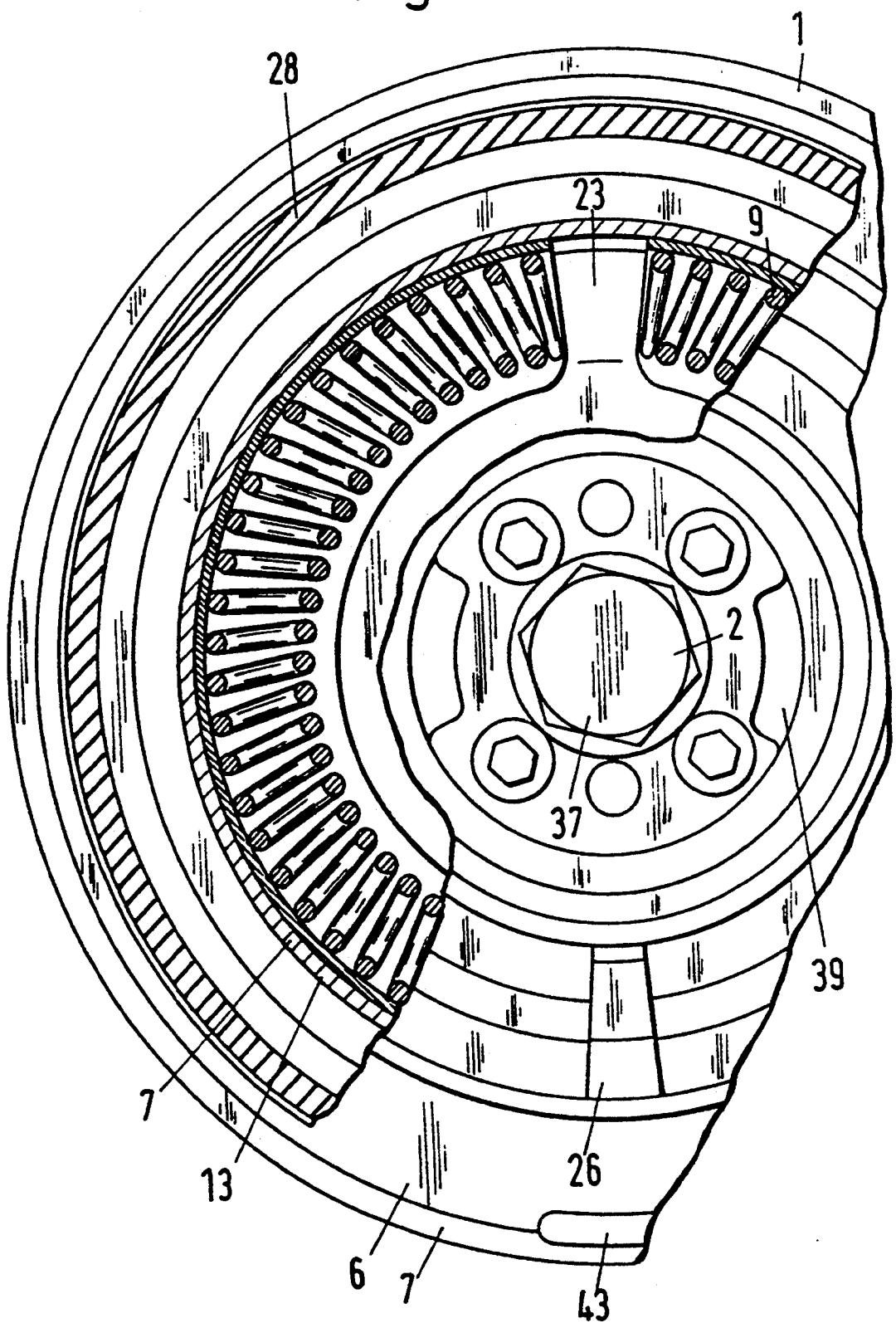
FIG. 2 is a fragmentary front elevational view as seen in the direction of arrow II in FIG. 1, portions of the input and output elements, inertial damper and damping unit being shogun in section.

The sheave 1 of FIGS. 1 and 2 comprises a rotary input element 3 which is indirectly connected to a driving member 2, e.g., the output member (such as a crankshaft) of a prime mover, particularly the internal combustion engine of a motor vehicle. The input element 3 is coaxial with and is rotatable relative to a coaxial output element 4 having a radially outer portion 10 including an externally profiled rim 11 for one or more endless flexible members (e.g., chains or belted, not shown. Such flexible member or members can be used to transmit motion to one or more auxiliary aggregates (e.g., servo Dumps, fans, air conditioners and/or others) in a motor vehicle or to transmit torque to the sheave 1. A damping unit 5 is installed between the input element 3 and the output element 4 to oppose rotation of such elements relative to each other. The damping unit 5 comprises two or more arcuate energy storing members 9, preferably coil springs, which are confined in an annular chamber 8 defined by a housing including two sheet metal sections 6, 7 of the output element 4.

The radially outer portion 10 and its rim 11 form part of the housing section 7. The latter further comprises a radially inwardly extending cupped portion 13 having a substantially washer-like outer part 12 and an axially extending radially inner portion 15. The cupped portion 13 defines an axially extending annular depression or groove 14 forming part of the chamber 8 for the coil springs 9 of the damping unit 5. The outer part 12 is of one piece with one axial end of the radially outer portion 10, and the radially inwardly extending portion 13 and its axially extending portion 15 are surrounded by the outer portion 10 and are disposed, at least to a large extent, between the two axial ends of the latter. Thus, the portion 13 of the section 7 of the output element 4 need not extend, or need not appreciably extend, beyond the two axial ends of the radially outer portion 10 and its rim 11. The axially extending radially inner part 15 of the portion 13 extends axially in a direction away from the chamber 8 for the coil sprints 9.

The sheave 1 further comprises a friction reducing device including an antifriction ball bearing 16 with an inner race 16a which is immediately adjacent to and is connected with (e.g., a tight fit on) an axially extending tubular intermediate portion 20 of the input element 3. The outer race of the bearing 16 is surrounded by and is immediately adjacent to and is connected with the axially extending part 15 of the portion 13 of section 7.

The section 6 of the output element 4 includes a washer-like radially outer portion 17 which is fixedly secured (e.g., welded, as at 18) to the radially extending part 12 of the portion 13, and a grooved second portion 19 which is inwardly adjacent the portion 17 and is configurated to surround a portion of the chamber 8 opposite the depression or groove 14 of the radially extending intermediate portion 13 of the section 7. The connection 18 preferably constitutes a circumferentially complete welded seam which seals the radially outermost portion of the chamber 8 in order to confine therein a supply of viscous fluid (such as oil or grease) which at least partially fills the chamber 8. The connection 18 can be established by resorting to a laser welding device, not shown.

The input element 3 comprises the aforementioned tubular intermediate portion 20, a radially outwardly extending flange 21 at one axial end of the tubular portion 20, and a radially inwardly extending flange 22 at the other axial end of the tubular portion 20. The radially outwardly extending flange 21 is provided with radially outwardly extending projections 23 in the form of arms which extend outwardly into the chamber 8 of the housing including the sections 6, 7 and alternate with the coil springs 9 of the damping unit 5. The sections 6 and 7 of the output element 4 comprise projections, in the form of pockets 26 and 27, respectively, which also extend into the chamber 8 to alternate with the coil springs 9. These coil springs are stressed by the adjacent arms 23 and by the pockets 26, 27 when the input element 3 is caused to rotate relative to the output element 4 and/or vice versa.

The sheave 1 further comprises a so-called inertial damper 25 having an annular mass 29 immediately adjacent the internal surface of the radially outer portion 10 of the section 7 of the output element 4. The damper 25 further comprises means for connecting the mass 29 to the driving member or shaft 2 at the free axial end of this shaft. The connecting means comprises a dished input portion 24 having a cylindrical hub 32 which non-rotatably surrounds the driving member 2, and a shock absorbing and damping member 28 which is connected between the input portion 24 and the mass 29. The member 28 surrounds a radially outermost part 34 of the input portion 24 and can be said to constitute a torsional damping device of the damper 25 and can be made of rubber or an elastomeric plastic material.

The input portion 24 of the inertial damper 25 serves as a means for transmitting torque between the driving member 2 and the input element 3. To this end, the sheave 1 further comprises fastening means in the form of rivets 35 tone shown in the lower half of FIG. 1) and/or screws or bolts 35a (one shogun in the upper half of FIG. 1). The fastening means 35 and/or 35a connect a median part of the input portion 24 with the radially inwardly extending flange 22 of the input element 3.

The inner race 16a of the antifriction bearing 16 surrounds that part (20a) of the tubular intermediate portion 20 of the input element 3 which is of one piece with the flange 22, and the intermediate portion 20 is provided with an external shoulder 20b serving as an abutment for one axial end of the inner race 16a. The part 20a of the tubular portion 20 is spacedly surrounded by the radially innermost part 15 of the intermediate portion 13 of the section 7, and the bearing 16 is disposed between the parts 15 and 20a to center the output element 4 on the input element 3.

The input portion 24 of the inertial damper 25 is cupped or dished and is formed with an open-sided recess 31 receiving the bearing 16 and a substantial part of the damping unit 5. The torsional damper 28 surrounds the input portion 24 of the inertial damper 25, and the mass 29 surrounds the torsional damper 28. This mass and the internal surface of the radially outer portion 10 and of its rim 11 define a relatively narrow cylindrical clearance 30 which communicates with the radially outermost portion of the recess 31 adjacent the part 12 of the radially inwardly extending portion 13 of the section 7. The open side of the recess 31 is the input portion 24 of the inertial damper 25 is remote from the prime mover (e.g., an engine) which drives the member 2 and is assumed to be located to the right of FIG. 1.

The section 7 of the housing of the output element 4 has a substantially U-shaped or C-shaped cross-sectional outline. The portion 13 of this section is disposed in the open-sided recess 31 and defines with the input portion 24 of the inertial damper 25 at least one passage 33 forming part of a ventilating and cooling system for the flow of atmospheric air between the section 7 and the input portion 24. Such cooling system further includes one or more channels 42 in the input portion 24 and one or more channels 43 in overlapping portions of the sections 6, 7 radially outwardly of the welded seam 18. As indicated in FIG. 1 by arrows, cool air can enter the passage or passages 33 through the channel or channels 42 of the input portion 24, and spent air can escape through the channel or channels 43 and/or through the narrow clearance 30 between the mass 29 and the radially outer portion 10 of the output element 4.

FIG. 1 further shows that the inertial damper 25, the radially outer portion 10 of the section 7 of the output element 4, and the damping unit 5 are interfitted in the axial direction of the sheave 1. Thus, the radially outer portion 10 surrounds at least the major part of the mass 29 which, in turn, surrounds at least the major part of the damping unit 5. This contributes to compactness and greater versatility of the improved sheave because its space requirements in the direction of the common axis of the input and output elements 3, 4 are surprisingly small. This renders it possible to install the improved sheave in spaces which are not sufficiently large to receive conventional sheaves which are used as pulleys or sprocket wheels, e.g., under the hoods of motor vehicles. The bearing 16 is confined in the recess 31 of the input portion 24 radially outwardly of the fastening means 35, 35a and radially inwardly of the damning unit 5. FIG. 1 further shows that the bearing 16 is aligned, at least in part, with the fastening means 35, 35a (as seen in the radial and axial directions of the sheave 1). Thus, the races of the bearing 16 can be disposed at a first distance from the left-hand axial end of the radially outer portion 10 of the output element 4 (as seen in the axial direction of the driving member 2), and the heads of the bolts or screws 35a can be disposed at a second distance from the left-hand axial end of the radially outer portion 10. The first distance matches or approximates the second distance. This also contributes to compactness of the improved sheave. The bearing 16 is rather closely adjacent the coil springs 9 of the damping units (at least as considered in the axial direction of the driving member 2), and these springs are located radially outwardly of the bearing.

The input element 3 of the sheave 1 defines a centrally located chamber or recess 36 which receives the head 37 of a fastener 38 serving to secure the hub 32 of the input portion 24 to the driving member 2 in a predetermined axial position. The open side of the chamber or recess 36 is normally overlapped by a disc-shaped closure 41 which is made of an elastically deformable plastic material and has a peripheral portion provided with a U-shaped groove 41a for the radially innermost portion 6a of section 6 of the output element 4. The radially innermost portion 6a of the section 6 can be received in the groove 41a by snap action to releasably hold the closure 41 in the position of FIG. 1. This closure reduces the likelihood of penetration of dust and/or other foreign matter into the chamber 36 and thence into the chamber 8 for the coil springs 9 of the damping unit 5.

The internal surface of the tubular portion 20 of the input element 3 is provided with an annulus of suitably configurated protuberances 39 (see particularly FIG. 2) which can be engaged by a suitable tool (not shown) upon detachment of the closure 41 from the section 6. The tool is used to hold the input element 3, the output element 4 and the input portion 24 against rotation while the head 37 of the fastener 38 is engaged by another tool which is used to fix the hub 32 of the input portion 24 in a predetermined axial position relative to the driving member 2.

The tubular portion 20 is located at the radially innermost end of the chamber 8 for the coil springs 9. Such radially innermost portion of the chamber 8 is at least substantially sealed from the atmosphere by the junction between the flange 21 and the tubular portion 20 on the one hand, and the adjacent portion of the section 6 on the other hand. These parts can define a relatively narrow annular gap 40.

The closure 41 is reapplied to the output element 4 (i.e., to the radially innermost portion 6a of the section 6) when the attachment of the input portion 24 of the inertial damper 25 Go the driving member 2 is completed. This closure not only prevents penetration of foreign matter into the chamber 8 through the chamber 36 and gap 40 but it also reduces the propagation of noise which is generated by an internal combustion engine if such engine serves as a means for driving the member 2 and the input portion 24 thereon.

The aforediscussed ventilating or cooling system including the passage or passages 33 and channels 42, 43 serves to reduce thermal stresses upon the sheave 1 and its damper 25. The input portion 24 can be provided with several equidistant channels 42 each of which can extend along an arc in the circumferential direction radially inwardly of the torsional damper 28. The channels 42 (which admit cool atmospheric air) are located radially outwardly of the channel or channels 43 which serve to discharge heated air in the region of the welded seam 18. This ensures that the stream or streams of air flowing from the channel or channels 42 toward and into the channel or channels 43 exchange heat with the input portion 24 of the damper 25 as well as with the section 7 of the output element 4 (and hence with the damping unit 5 in the chamber 8). The channel or channels 43 can also extend along one or more arcs in the circumferential direction of the elements 3 and 4 (see FIG. 2 which illustrates an arcuate channel 43). For example, the number of channels 42 and/or the number of channels 43 can be at least four and need not exceed sixteen. If the sections 6 and 7 are provided with plural channels 43, such channels are preferably equidistant from each other. The channel or channels 42 act not unlike suction ports or orifices which draw cool atmospheric air into the passage or passages 33 in response to rotation of the sheave 1. The thus drawn stream or streams of air flow between the section 7 and the input portion 24 outwardly toward and along the radially outermost part 34 of the portion 24 and thereupon into the channel or channels 43 and/or into the clearance 30. Adequate cooling of the sheave 1 is particularly desirable on the ground that the torsional damper 28 is made of an elastomeric material which can be affected by overheating.

Figure 3:
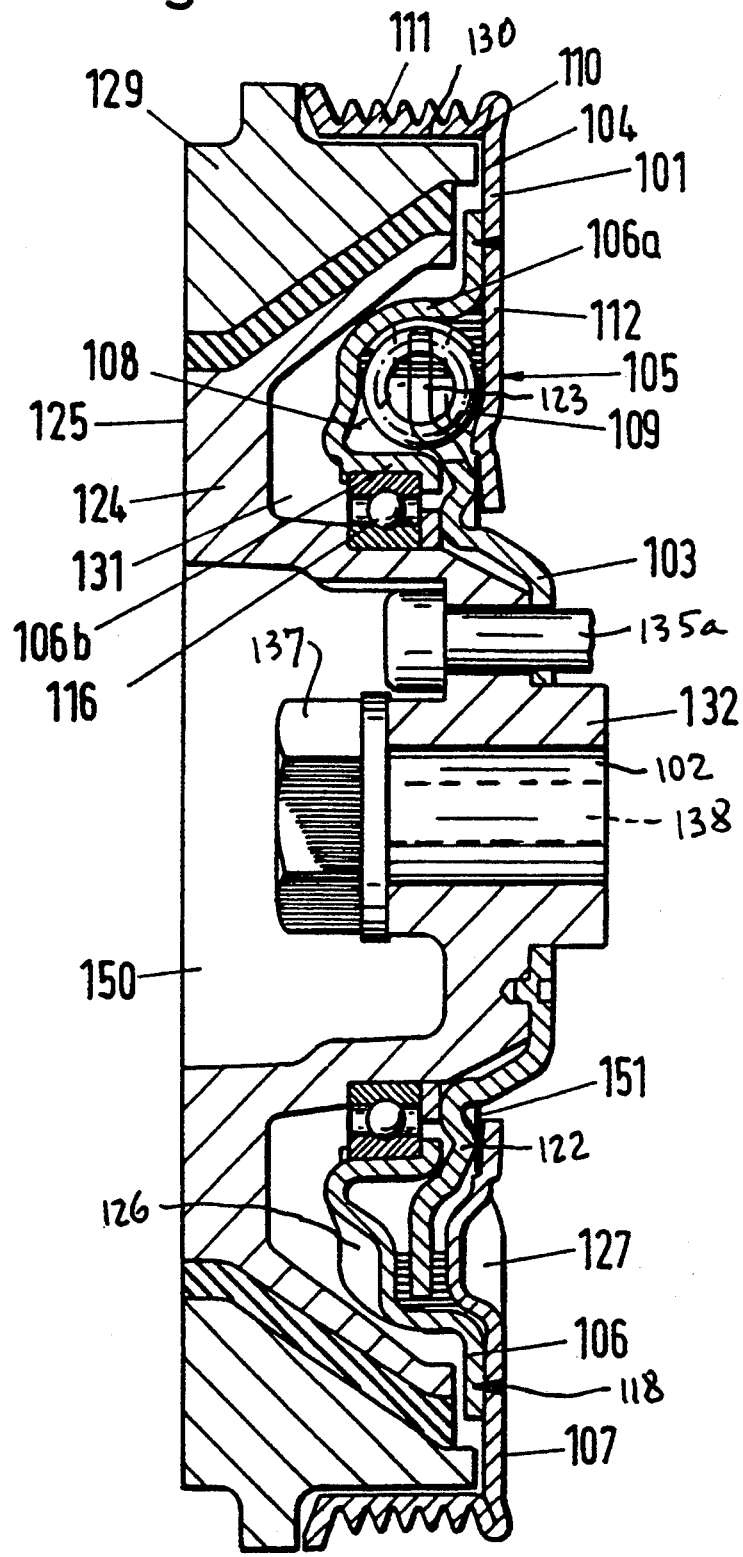
FIG. 3 is an axial sectional view of a modified sheave.

FIG. 3 shows a modified sheave 101. All such parts of this sheave which are identical with or clearly analogous to corresponding parts of the sheave 1 of FIGS. 1 and 2 are denoted by similar reference characters plus 100. The inertial damper 125 extends to the left beyond the profiled rim 111 of the radially outer portion 110 of the section 107 which forms part of the output element 104 of the sheave 101. The recess 131 in the input portion 124 of the damper 125 is open toward the engine which is located to the right of the sheave 101. This recess confines the friction reducing device including an antifriction bearing 116 as well as at least the major part of the damping unit 105 including the coil springs 109, the arms 123 on the flange 122 of the input element 103 and the pockets 126, 127 of the sections 106, 107 of the output element 104. The damping unit 105 is disposed between the prime mover which rotates the member 102 and the input portion 124 of the damper 125 (as seen in the axial direction of the sheave 101). If the illustrated sheave 101 is to receive torque from a belt or chain which is driven by a remote prime mover, the member 102 serves to drive one or more aggregates, e.g., a pump, a fan or an air conditioner in a motor vehicle. The same holds true for the sheave 1 of FIGS. 1 and 2, i.e., this sheave can be rotated by one or more endless belts or chains to transmit torque to the member 2 which then serves to drive one or more aggregates or the like.

The recess 131 of the input portion 124 is located radially outwardly of a centrally located recess 150 which is open at the side remote from the damping unit 105 (as seen in the axial direction of the sheave 101) to afford access to the head 137 of the fastener 138.

The profiled rim 111 of the radially outer portion 110 of the output element 104 surrounds a substantial part of the annular mass 129 of the damper 125. The bearing 116 is disposed between an output member 106b of the damping unit 105,104 and a radially inner part of the input portion 124 of the damper 125. The character 135a denotes one of the fastening means serving to transmit torque from the input element 103 to the hub 132 of the input portion 124 or in the opposite direction. The input element 103 is centered on the hub 132 of the input portion 124 of the damper 125. The coil springs 109 of the damping unit 105 are confined in a chamber 108 between the sections 106, 107 of the output element 104.

The bearing 116 is installed radially inwardly of the chamber 108 for the damping unit 105 in such a way that the bearing and the damping unit are disposed at the same axial distance from the left-hand end face of the damper 125, i.e., the bearing 116 is in substantial radial and axial alignment with the coil springs 109. The sections 106, 107 of the output element 104 are or can be made of a metallic sheet material. The section 107 is simpler than the section 6 because, in addition to the radially outer portion 110 and profiled rim 111, the section 107 comprises only a substantially disc-shaped radially inwardly extending part 112 which is welded (as at 118) to the radially extending radially outermost portion of the section 106. Thus, the section 107 does not define a depression (corresponding to the depression 14 shown in FIG. 1) for portions of the coil springs 109. Such coil springs are confined primarily or entirely in a depression of the radially outer portion 106a of the section 106. The latter further comprises the radially inner portion 106b which extends axially of the sheave 101 and receives the outer race of the bearing 116. The section 106 has a substantially C-shaped or U-shaped cross-sectional outline and is provided with the aforementioned projections in the form of pockets 126 cooperating with the projections or pockets 127 of the section 107 as well as with the arms 123 on the flange 122 to stress the coil springs 109 in response to rotation of the input and output elements 103, 104 relative to each other. The bearing 116 centers the section 106 of the output element 104 on the input portion 124 of the damper 125.

The sheave 101 further comprises a substantially washer-like sealing element 151 which is installed between the input element 103 and the radially inner portion of the section 107 to seal the radially inner portion of the chamber 108 from the atmosphere. The sealing element 151 can constitute or include a resilient membrane which is stressed in the axial direction and rotates with the input element 103 to bear with friction against the section 107 or vice versa. At least the major part of the section 106 of the output element 104 is confined in the recess 131 of the input portion 124.

The sheave 101 can also comprise a cooling system which serves to prevent overheating of the inertial damper 125, particularly of the torsional damper 128. Such cooling system can be identical with or similar to the cooling system (including the passage 33 and the channels 42, 43) of the sheave 1.

An important advantage of the improved sheave is its compactness. This is due to the aforediscussed interfitting of the radially outer portion 10 or 110 of the output element 4 or 104, inertial damper 25 or 125 and damping unit 5 or 105. The improved sheave is compact in the radial direction as well as (and particularly) in the axial direction. Such desirable compactness in the axial direction is achieved in that the damping unit and at least the major portion of the annular mass of the inertial damper are disposed between the two axial ends of the radially outer portion 4 or 104. At least the major portions of the coil springs 9 or 109 are located within the confines of the annular mass 29 or 129 (as seen in the axial direction of the sheave 1 or 101). The width of the cylindrical clearance 30 or 130 between the radially outer portion 10 or 110 and the mass 29 or 129 need not exceed 1–2 mm. This, too, contributes to compactness of the sheave. The same holds true for at least partial confinement of the damping unit 5 or 105 in the recess 31 or 131 of the input portion 24 or 124. The recess 31 or 131 can be bounded by a substantially conical or by a substantially spherical surface of the input portion 24 or 124.

The improved sheave can be modified in a number of additional ways without departing from the spirit of the invention. For example, the sheave 1 or 101 can embody one or more features of the sheaves which are disclosed in the commonly owned copending patent application Ser. No. 07/925,599 of even date which was filed by Helmut Braun et al. for "Sheave" and the disclosure of which is incorporated herein by reference. For example, the energy storing members 9 or 109 of the damping unit 5 or 105 can be constructed, dimensioned and mounted in a manner as described in the copending patent application of Braun et al. The same holds true for the means for sealing the chamber 8 or 108 to ensure that the supply of viscous fluid remains confined therein. Furthermore, at least some features of the improved sheave are considered to be patentable per se.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A sheave comprising a rotary input element connectable with a rotary driving member for rotation about a predetermined axis; an output element coaxial with and rotatable relative to said input element and including a radially outer portion having a substantially axially extending rim engageable by a flexible member; a friction reducing device disposed between said elements; a damping unit installed between said elements radially inwardly of 10 said radially outer portion of said output element to oppose rotation of said elements relative to each other and including energy storing members which store energy in response to rotation of said elements 14 relative to each other; and an inertial damper comprising a mass and means, including a torsional damping device, for connecting said mass to the driving member, at least a portion of said mass being radially inwardly adjacent said radially outer portion of said output element, said inertial damper and said damping unit as well as said radially outer portion of said output element being interfitted in the axial direction of said elements.

2. The sheave of claim 1, wherein said driving member is the output member of an engine and said flexible member transmits motion to at least one auxiliary aggregate of a motor vehicle.

3. The sheave of claim 1, wherein said energy storing members are coil springs extending in the circumferential direction of said elements, said friction reducing device comprising at least one antifriction bearing and said rim having a profiled portion which is engageable by said flexible member.

4. The sheave of claim 1, wherein said radially outer portion of said output element has a first axial end and a second axial end, said damping unit and said mass having major portions disposed between said axial ends.

5. The sheave of claim 1, wherein said mass is substantially ring-shaped and is immediately adjacent to and surrounded by said radially outer portion of said output element.

6. The sheave of claim 1, wherein said connecting means of said inertial damper comprises a substantially dished input portion which is disposed radially inwardly of said mass, said input portion having a recess and at least a major portion of said damping unit being received in said recess.

7. The sheave of claim 6, wherein said recess extends axially of said elements.

8. The shears of claim 1, wherein said connecting means of said inertial damper comprises an input portion which is connectable with said driving member, said input element being provided on said input portion.

9. The sheave of claim 8, further comprising means for fastening said input element to said input portion, said fastening means being disposed radially inwardly of said friction reducing device.

10. The sheave of claim 1, wherein said driving member includes a shaft having an end portion and said connecting means of said inertial damper comprises an input portion connected with said shaft at said end portion, said input .portion having a recess with an open side affording access to said end portion, at least a major portion of said damping unit being disposed in said recess.

11. The sheave of claim 1, wherein said connecting means of said inertial damper Comprises an input portion connectable with said driving member and means for fastening said input element to said input portion, said radially outer portion of said output element having first and second axial ends, said friction reducing device being disposed at a first axial distance from one of said axial ends and said fastening means being disposed at a second axial distance from said one axial end, said second distance at least approximating said first distance.

12. The sheave of claim 1, wherein said mass is ring-shaped and is disposed radially outwardly of said damping unit, said friction reducing device being disposed radially inwardly of said damping unit.

13. The sheave of claim 1, further comprising an at least substantially sealed ringshaped housing for said energy storing members and a supply of viscous fluid at least partially filling said housing.

14. The shears of claim 13, wherein at least a major portion of said housing is part of said output element.

15. The sheave of claim 1, wherein said output element consists of metallic sheet material and said radially outer portion thereof includes a first axial end and a second axial end, said output element further including a radially inwardly extending portion rigid with one axial end of said radially outer portion and having an axially extending annular depression for reception and guidance of said energy storing members, said radially inwardly extending portion including an axially extending annular radially inner portion and said friction reducing device including an antifriction bearing having an outer race adjacent and surrounded by said radially inner portion.

16. The sheave of claim 15, wherein said radially outer portion, said radially inwardly extending portion and said axially extending portion together constitute a first section of said output element and said output element further comprises a second section consisting of metallic sheet material, said second section including a radially outer portion affixed to said first section and a second portion disposed radially inwardly of said radially outer portion of said second section and defining an annular groove for portions of said energy storing members, said second portion overlying said depression.

17. The sheave of claim 16, wherein said sections include projections which alternate with and are arranged to stress the energy storing members of said damping unit in the circumferential direction of said depression in response to rotation of said elements relative to each other.

18. The sheave of claim 1, wherein said energy storing members extend circumferentially of said elements and said input element comprises projections which alternate with and are arranged to stress said energy storing members in response to rotation of said elements relative to each other.

19. The sheave of claim 18, wherein said input element further comprises a tubular intermediate portion having a first axial end and a second axial end, a first flange extending substantially radially outwardly from one of said axial ends and including said projections, and a second flange extending substantially radially inwardly from the other of said axial ends and connectable with said driving member.

20. The shears of claim 19, wherein said friction reducing device includes an antifriction bearing having an inner race surrounding and adjacent said intermediate portion of said input element.

21. The sheave of claim 19, wherein said tubular intermediate portion has an internal surface provided with at least one protuberance to facilitate engagement of said input element by a tool.

22. The sheave of claim 21, wherein said internal surface is provided with a plurality of protuberances forming an annulus extending circumferentially of said intermediate portion.

23. The sheave of claim 1, wherein said input element has a centrally located chamber and further comprising a closure overlying said chamber.

24. The sheave of claim 23, wherein said closure is provided on said output element.

25. The sheave of claim 1, further comprising a housing for said energy storing members and a detachable closure for said housing, said input element being connectable to said driving member upon detachment of said closure.

* * * * *